United States Patent
Metcalfe

(10) Patent No.: US 10,044,188 B2
(45) Date of Patent: Aug. 7, 2018

(54) METHOD AND SYSTEM FOR LOCALLY CONTROLLING POWER DELIVERY ALONG A DISTRIBUTION FEEDER LINE OF AN ELECTRICITY GRID

(71) Applicant: ENBALA Power Networks Inc., North Vancouver (CA)

(72) Inventor: Malcom Metcalfe, British Columbia (CA)

(73) Assignee: ENBALA Power Networks Inc., North Vancouver, British Columbia (CA)

( * ) Notice: Subject to any disclaimer, the term of this patent is extended or adjusted under 35 U.S.C. 154(b) by 0 days.

(21) Appl. No.: 15/570,301

(22) PCT Filed: May 5, 2016

(86) PCT No.: PCT/CA2016/050519
§ 371 (c)(1),
(2) Date: Oct. 27, 2017

(87) PCT Pub. No.: WO2016/176775
PCT Pub. Date: Nov. 10, 2016

(65) Prior Publication Data
US 2018/0131188 A1 May 10, 2018

Related U.S. Application Data

(60) Provisional application No. 62/157,374, filed on May 5, 2015.

(51) Int. Cl.
*H02J 3/16* (2006.01)
*H02J 13/00* (2006.01)
*H02J 3/18* (2006.01)

(52) U.S. Cl.
CPC .............. *H02J 3/16* (2013.01); *H02J 3/1878* (2013.01); *H02J 13/00* (2013.01)

(58) Field of Classification Search
CPC .............. H02J 3/16; H02J 3/1878; H02J 13/00
See application file for complete search history.

(56) References Cited

U.S. PATENT DOCUMENTS

| | | | |
|---|---|---|---|
| 6,114,841 A * | 9/2000 | Hasler .................. | H02J 3/1864 323/207 |
| 8,156,055 B2 * | 4/2012 | Shimada ............. | H02J 13/0079 706/12 |

(Continued)

FOREIGN PATENT DOCUMENTS

DE 102013100999 7/2014

OTHER PUBLICATIONS

International Search Report and Written Opinion of the International Searching Authority, dated Jul. 14, 2016, for corresponding International Application No. PCT/CA2016/050519, 11 pages.

*Primary Examiner* — Jue Zhang

(57) ABSTRACT

A method and a system for controlling grid power distribution by using a controllable real power resource at nodes on the feeder line and a tap changer in a substation on the feeder line by setting a target phasor value at each node that maintains a required power delivery to the real and reactive power resources with a defined acceptable voltage at all nodes with a feeder line loss below an allowable feeder line power loss threshold. The target phasor value is selected to use the substation tap changer less frequently as compared to the reactive power resource to provide voltage management of the feeder line, wherein the power resource is adjusted so that the actual voltage magnitude moves towards the target voltage magnitude at each node.

14 Claims, 2 Drawing Sheets

(56) References Cited

U.S. PATENT DOCUMENTS

| | | | | |
|---|---|---|---|---|
| 8,862,281 B2* | 10/2014 | Yoneda | ............... | H02J 13/0079 700/286 |
| 8,914,133 B2* | 12/2014 | Lee | .................... | H04L 43/0817 700/1 |
| 9,146,549 B2* | 9/2015 | Pernia | ........................ | G06F 1/26 |
| 2012/0004871 A1* | 1/2012 | Tsao | ................... | G01R 19/2513 702/61 |
| 2012/0248874 A1 | 10/2012 | Pan et al. | | |
| 2014/0214729 A1* | 7/2014 | Lin | ........................ | G06Q 50/06 705/412 |
| 2015/0280435 A1* | 10/2015 | Metcalfe | ................ | G06Q 50/06 700/295 |

\* cited by examiner

METHOD AND SYSTEM FOR LOCALLY CONTROLLING POWER DELIVERY ALONG A DISTRIBUTION FEEDER LINE OF AN ELECTRICITY GRID

CROSS REFERENCE TO RELATED APPLICATIONS

This is the U.S. National Stage of International Application No. PCT/CA2016/050519, filed May 5, 2016, which in turn claims the benefit of U.S. Provisional Application No. 62/157,374, filed May 5, 2015. The provisional application is incorporated herein in its entirety.

FIELD

This disclosure relates generally to a method and system for locally controlling power delivery along a distribution feeder line of an electricity grid.

BACKGROUND

The design of electrical power distribution infrastructure ("electricity grid") has evolved over decades to ensure that the electrical power that customers receive meet certain quality standards relating to voltage, frequency, and reliability.

In recent years, an increased penetration of solar power and other intermittent power generation sources in the electricity grid are causing significant control problems. For example, connected solar capacity as low as 10% of peak capacity on a distribution feeder line may result in voltage violations that are beyond ANSI-defined limits. This intermittent generation capacity must be balanced with either load or generation adjustments elsewhere on the electricity grid in order to maintain system frequency. Often, a generation facility used for balancing is located a significant distance from a feeder line containing the intermittent generation source thus resulting in significant marginal power losses, which in some cases may exceed 30%.

Also, intermittent power generation tends to cause voltage changes that can result in poor customer power quality and excess wear on substation tap changers. These substation tap changers incur increased maintenance needs and failure rates resulting from increased use caused by the intermittency. To avoid conflict between utility voltage management systems and voltage regulation capability on solar inverters, as well as to avoid potential poor regulation caused by customer equipment, intermittent generator operators have been forbidden from regulating the system voltage (IEEE 1547 and California Rule 21). Instead, electrical utilities have been monitoring line voltages and installing some in line capability to manage voltage where needed. This approach tends to be slow in response time, and costly for the utility to implement.

Conventional electrical distribution systems are not designed to accommodate the increasing amount of intermittent generation, and new solutions are sought to address these challenges.

SUMMARY

According to one aspect, there is provided a method for locally controlling delivery of electrical power along a distribution feeder line of an electricity grid. The distribution feeder line comprises a substation and a plurality of nodes. The plurality of nodes comprises at least a first node having at least one controllable real power resource and a second node having at least one controllable reactive power resource. The method comprises setting a target phasor value at each node that maintains a required power delivery to the real and reactive power resources with a defined acceptable voltage at all nodes and wherein the power is delivered with a feeder line loss at or below a defined threshold ("allowable feeder line power loss threshold") and with operation of a utility voltage management device is kept at or below a defined threshold. The target phasor value for each node includes a target voltage magnitude and a target phase angle relative to the substation. The method also comprises monitoring an actual phasor value at each node, a real power value at the first node and a reactive power value at the second node; the actual phasor value includes an actual voltage magnitude and an actual phase angle relative to the substation. The method also comprises adjusting operation of the at least one controllable reactive power resource so that the actual voltage magnitude moves towards the target voltage magnitude at each node; and adjusting operation of the at least one controllable real power resource so that the actual phase angle moves towards the target phase angle at each node.

The step of setting a target phasor value at each node can comprise: (a) calculating the current flow of a sector of the feeder line between adjacent nodes using the actual phasor value at each of the adjacent nodes; (b) calculating the total real and reactive loss on the feeder line by summing a real power loss and a reactive power loss of each sector of the feeder line; (c) calculating the real and reactive power being removed or injected at each node using the actual phasor value at each node; (d) calculating a minimum total feeder line power loss, by determining a minimum current flow along the feeder line that meets power delivery and voltage requirements of each node; and (e) selecting an allowable feeder line power loss threshold at or above the minimum total feeder line power loss, then determining the voltage magnitude and phase angle at each node that is required to achieve the allowable feeder line power loss.

At least one controllable real power resource can serve a primary process, in which case adjusting the operation of the least one controllable real power resource falls within operational constraints of the primary process. The at least one controllable real power resource can comprise at least one load resource, in which case the adjusting of the operation of the at least one controllable real power resource comprises increasing a load on the at least one load resource to increase the actual phase angle, and decreasing the load on the at least one load resource to decrease the actual phase angle. The at least one controllable real power resource can also comprise at least one generation resource, in which case adjusting the operation of the at least one controllable real power resource comprises decreasing generation by the at least one generation resource to increase the actual phase angle, and increasing generation by the at least one generation resource to decrease the actual phase angle.

The adjusting of the operation of the at least one reactive power resource can comprise using a capacitor to increase reactive power thereby increasing the actual voltage magnitude and using an inductor to decrease reactive power thereby decreasing the actual voltage magnitude.

The plurality of nodes can include a third node having an intermittent power generation source, in which case the method further comprises adjusting the target phasor setting at each node after a change in power generation from the intermittent power generation source.

The utility voltage management device can comprise a tap changer, and along with the at least one controllable reactive power resource are known as voltage management devices. The at least one controllable reactive resource can be assigned a lower operating cost than the tap changer, and the method can further comprise selecting one or more voltage management devices to control voltage along the feeder line that is a cost effective combination within a defined operating cost budget for the voltage management devices.

The feeder line can comprises multiple controllable real power resources, in which case the method can further comprise assigning an operating cost to each controllable real power resource, then selecting a cost effective combination of controllable real power resources to control phase angle along the feeder line that is within a defined operating cost budget for the real power resources.

DETAILED DESCRIPTION

Embodiments described herein relate generally to a method and system for locally controlling delivery of electrical power along a distribution feeder line in an electricity grid (herein referred to as a "local power control method and system"). The distribution feeder line comprises a substation and a plurality of nodes, wherein the substation comprises controllable voltage management devices such as tap changers (herein referred to as "utility voltage management devices") and at least some of the nodes comprise controllable real power resources and controllable reactive power resources. The system includes a server having a processor and a memory having encoded thereon a distributed power delivery control program, and controllers communicative with the server over a network. A controller is installed at each node having a controllable real power resource or a controllable reactive power resource and at the substation; each controller is operable to control operation of the real and/or reactive power resources at that node and the utility voltage management devices at the substation. The control program when executed will set a target phasor value at each node that comprises a target voltage magnitude and a target phase angle relative to the substation. The target phasor at each node is selected such that the system delivers a required amount of power to the real and reactive power resources at an acceptable voltage, while ensuring that the power is delivered with a feeder line loss that is below a defined threshold. The target phasors can also be selected to minimize use of substation tap changers. The actual phasor value at each node is monitored by a synchrophaser to obtain actual voltage magnitude and actual phase angle (relative to the substation) values. The controllers installed at reactive power resource nodes control the operation of those reactive power resources so that the actual voltage magnitude of each node moves towards its target voltage magnitude. Similarly, the controllers installed at real power resource nodes control the operation of those real power resources so that the actual phase angle of each node moves towards its target phase angle.

By controlling voltage levels locally using controllable real and reactive power resources, it is expected that feeder line power losses will be reduced as the need for remotely located facilities to provide balancing is reduced, and voltage levels along the feeder lines is expected to fall within acceptable ranges (e.g. within ANSI defined limits) as voltage levels are firmed along the feeder line. This can be particularly useful on feeder lines that contain an intermittent generation source such as a solar power plant, which can cause frequent voltage changes.

System

Figure 1:
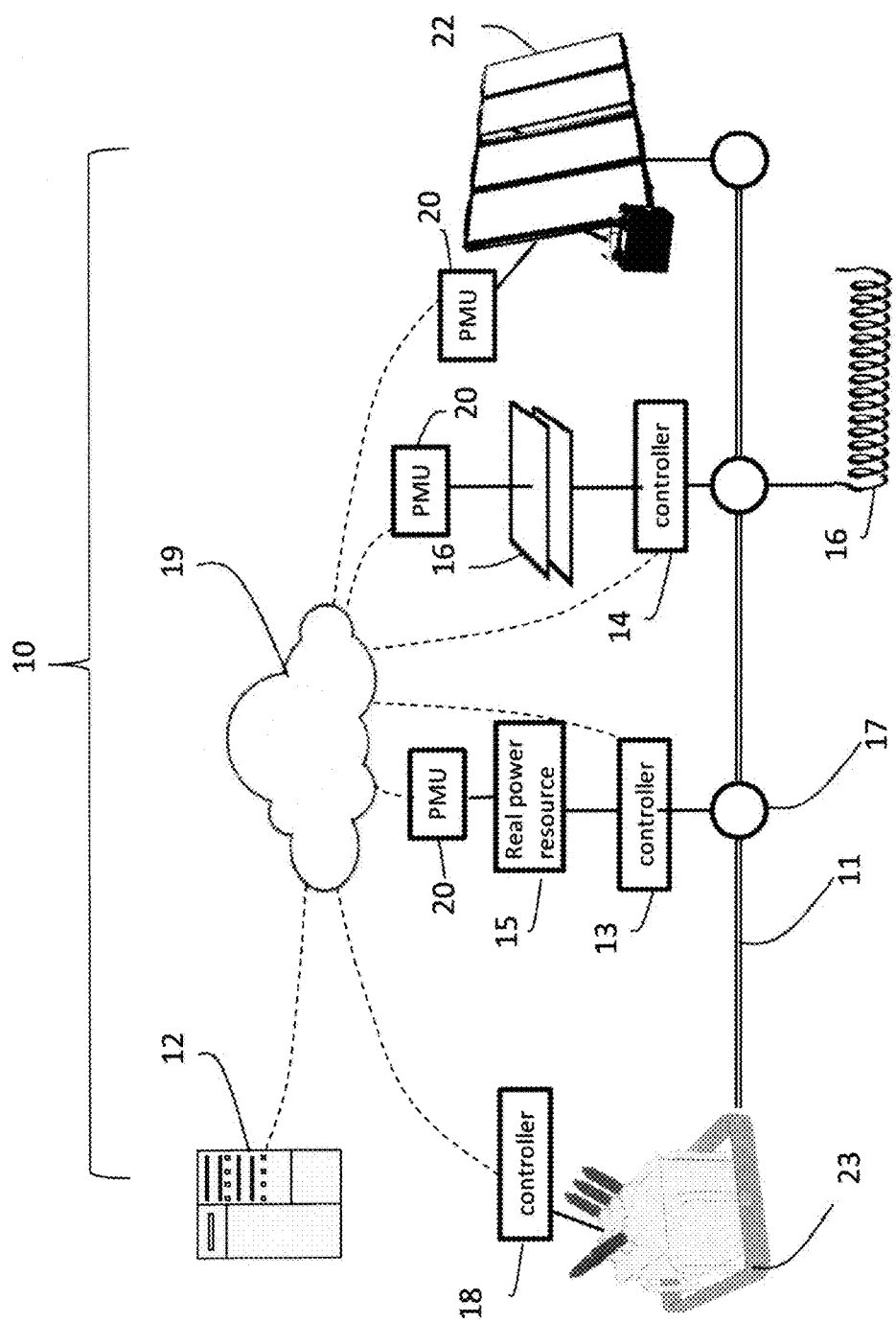
FIG. 1 is a block diagram of an apparatus for providing distributed control to resources on a distribution feeder line of an electricity grid according to one embodiment.

In the embodiments described herein and referring to FIG. 1, a local power control system 10 for providing local control of power delivery along a distribution feeder line 11 comprises a central server computer 12, controllers 13 for controlling real power resources 15, controllers 14 for controlling reactive power resources 16 at node sites 17 ("nodes") along the feeder line (respectively referred to as "real power resource controllers" 13 and "reactive power resource controllers" 14), and controllers 18 for controlling utility voltage management devices 23. The controllers 13, 14, 18 are communicative with the server computer 12 over a network 19 such as the Internet, either directly or with the addition of security tunnelling hardware or software; alternatively, the server computer 12 can be fitted with dedicated communication links to the controllers 13, 14, 18 such as Frame Relay.

The distribution feeder line 11 comprises a plurality of node sites 17 ("nodes"), wherein some nodes 17 have one or more controllable real power resources 15 and/or one or more controllable reactive power resource 16, and other nodes 17 have one or more non-controllable resources such as an intermittent power generation source 22. For the sake of simplicity, FIG. 1 illustrates one node 17 having one controllable real power resource 15, a second node 17 having two controllable reactive power resources, namely a capacitor and an inductor, and a third node having a non-controllable solar power generation resource 22. The distribution feeder line also comprises a substation comprising one or more tap changers 23 and/or other utility voltage management devices.

The real and reactive power resources 15, 16 are typically located along the node sites 17 at locations remote from the server computer 12. The real power resources 15 can be electrical generators having capacity to generate power ("generation resource"), electricity-powered devices having capacity to consume a load ("load resource"), and storage devices having capacity to store energy ("storage resource") for short periods and later release it back to the grid. The reactive power resources 16 can be capacitors that "generate" reactive power, and inductors that "consume" reactive power.

In this embodiment, the controllable real power resources 15 are all load resources, and in particular comprise multiple single-speed water pumps, analog electrical boilers, and analog electrical blowers. These real power-consuming load resources 15 are normally intended to serve a primary process other than providing local power control to a feeder line (herein referred to as "process load resources"), and the power control system 10 is configured to operate these load resources 15 to provide local power control only within the operational constraints defined by the original primary processes of these process load resources 15. For example, the water pumps are used primarily to regulate the water level in a municipal water supply tank, each electrical boiler is used primarily to provide heat and domestic hot water for a building as part of a hybrid electric-gas heating system, and the blowers are used primarily to aerate a waste water treatment tank.

A load resource controller 13 is installed at the node site 17 of the process load resource 15 and communicates with the remotely-located server computer 12. As will be explained in detail below, each load resource controller 13 receives target phasor set-points from the server computer 12 comprising a target voltage magnitude and a target phase angle, and is programmed to operate the process load resource 15 at a load set-point that causes the actual phase angle at the node site 17 to be moved towards the target phase angle, but is also programmed to only operate the process load resource 15 when the load set-point is within the operational constraints of the process load resource 15 (typically defined by the load resource's own control system). In other words, the load resource controller 13 is programmed to allow the load resource's control system to override the load resource controller 13 when the operators of the primary process require the process load resource 15 to be used for its primary processes. For example, a municipal water plant operator may require that a water tank be kept between 10% and 90% full of water, and the load resource controller 13 is programmed to allow the server computer 12 to operate the pumps for this tank while the water level is within this range in order to provide local power control to the feeder line 11. However, when the water level in the tank rises to 90% full, the load resource's control system will be allowed to turn the pumps on, even if the server computer 12 desires the pumps to be kept off. Controllable process load resources 15 which are being used at a given time to serve their primary process are considered to be "off-line" to the server computer 12 and not available to provide local power control; conversely, controllable load resources 15 which are within their primary operational constraints are considered "on-line" and available to be used to provide local power control. "Off-line" load resources 15 are compensated for by the server computer 12 with other "on-line" load resources 15 so that the overall power control functionality is preserved.

The load resource controller 13 in this embodiment is a small rugged computer with capability to connect to the Internet 19, and to connect to the load resources 15 at their respective resource node sites 17. The connection between the load resource controller 13 and the server computer 12 is achieved through the internet 19, using a secure means of communications. The load resource controller 13 is connected to the generation resource, load resource, or storage resource using one of a number of methods, including: direct wiring to controllers or governors of the load resource control system; direct connection to the Supervisory Control and Data Acquisition (SCADA) System used to control the process load resource 15 at the resource node site 17, or connection to the network 19 used by the control system at the node site 17 that controls the load resource 15. The real power resource controller 13 is also connected to metering devices (not shown) that measure, to revenue standards, the power being delivered or consumed by the process load resources 15.

The load resource controller 13 may be connected to additional measurement equipment (not shown) as required to ensure that operating constraints can be properly met, by: direct wiring to controllers or measurement equipment; direct connection to the SCADA System used to measure the process load resources 15 at the resource node site 17; or connection to a network 19 used by the load resource's control system at the node site 17 to measure the process load resource 15.

In operation, the load resource controller 13 will receive a target phasor signal from the server computer 12, directing a change in consumption or generation from one or more of the process load resources 15 at the node site 17. The real power resource controller 13 will validate the received signal against the operating constraints of the process load resource 15 and clamp the signal if required. The control system of the load resource 15 will send the set-point signal to the process load resource 15 identified by the server computer 12, commanding the requested change.

At every update interval (e.g. 2 seconds), the load resources controller 13 will send a series of signals to the server computer 12, specifically:

The status or level of operation of each process load resource 15 at the resource node site 17 (there may be multiple load resources connected to each load resource control system). The load resource controller 13 will aggregate and send a total power signal to the server computer 12, reflecting the power generated or consumed at that site;

The load resource controller 13 will send a separate signal to the server computer 12 to define the maximum and minimum power levels that are available for the existing process load resources 15 at the resource node site 17;

Any additional state information required by the server computer 12 to execute its costing subroutine, as will be described below; and An indicator if the load resource controller 13 itself, or the SCADA, or the load resource control system, has suspended server computer 12 control, and the current local control set-point if the server computer 12 control is suspended.

The load resource controller 13 will then store the command status and the power levels measured for every resource at the resource node site 17. Data storage at the local load resource controller 13 should be sufficient to maintain all records for an extended period of time, for example two years. The server computer 12 and the load resource 15 are time-synchronized so that all time-stamped communications between nodes 17 can be properly interpreted. The control and status protocol between the server computer 12 and the load resources 15 insures that network issues (e.g. packet loss or reordering), does not cause incorrect control actions. The system will run continuously, with an intended cycle time between the server computer 12 and the load resource controller 13 of about 5-10 seconds. Local storage of data is maintained, time stamped in the revenue grade meters, in the server computer 12 and in the control system of the load resources 15.

Like the load resource controllers 13, the reactive power resource controllers 14 are located at each node site 17 of reactive power resources 16, and are operable to control the operation of those reactive power resources 16. The reactive power resource controller 14 has the same hardware design as the load resource controller, and is programmed to operate to control the reactive power resources 16. Similarly, the utility resource controller 18 is of the same hardware design as the load and reactive power resource controllers 13, 14 with programming adapted to control the utility voltage management devices 23.

Synchrophasers 20 (otherwise known as phasor measurement units (PMU)) are installed at each node 17 and measure the voltage magnitude |V| and the voltage angle δ at every location that is monitored. The synchrophasers 20 are communicative with the server computer 12 via the network 19.

The server computer 12 is a redundant server computer system, equipped with a reliable operating system such as Linux, real time software, and a long-term database. The server computer 12 is desirably installed at a secure location, protected from unauthorized physical access, where there is a reliable connection to the internet and a backed-up supply of electricity. The server computer 12 may be a system that is spread across multiple hardware chassis either to aggregate sufficient processing capability, or to provide redundancy in the event of failure, or both. One chassis can operate as the primary server computer 12, and another as a backup server computer 12. Each chassis can run a multi-core capable operating system.

Power Delivery Control Program and System Operation

The server computer 12 has a processor and a memory on which is stored a power delivery control program which when executed by the processor controls the utility voltage management devices 23 and the real and reactive power resources 15, 16 to deliver a required amount of power to the feeder line 11 at an acceptable voltage, while ensuring that this power is delivered with a feeder line power loss that is below a defined threshold and while minimizing the operation of the utility voltage management devices 23 and in particular, the substation tap changer.

As will be discussed in more detail below, the power delivery control program controls the voltage along the feeder line by controlling the operation of the reactive power resources 16 and the utility voltage management devices 23 (collectively "voltage management devices") and controls the phase angle δ along the feeder line by controlling the operation of the real power resources 15. Generally, the voltage magnitude between two adjacent nodes is similar, and the phase angle will generally be small. Under these conditions, the real power flow in the feeder line will tend to track the phase angle δ and the reactive power flow will track the difference in voltage between the sending and receiving nodes. Using these principles and as will be described in detail below, the power control program is able to determine the target phasor (voltage magnitude and phase angle) at each node that is required to deliver power to the feeder line at a defined feeder line power loss. The power control program also includes a voltage management device optimization module that can preferentially select certain voltage management devices over others, by assigning an operating cost to each voltage management device. In particular, the voltage management device optimization module assigns a relatively high operating cost to the substation tap changer 18 compared to the reactive power resources 16 in order to minimize the use of the tap changer 18 when controlling the voltage magnitude at each node along the feeder line.

The power control program also includes a load resource management module which comprises program code for determining which process load resources are available to provide power control, and also to select a cost-effective combination of available process load resources to provide this control.

Figure 2:
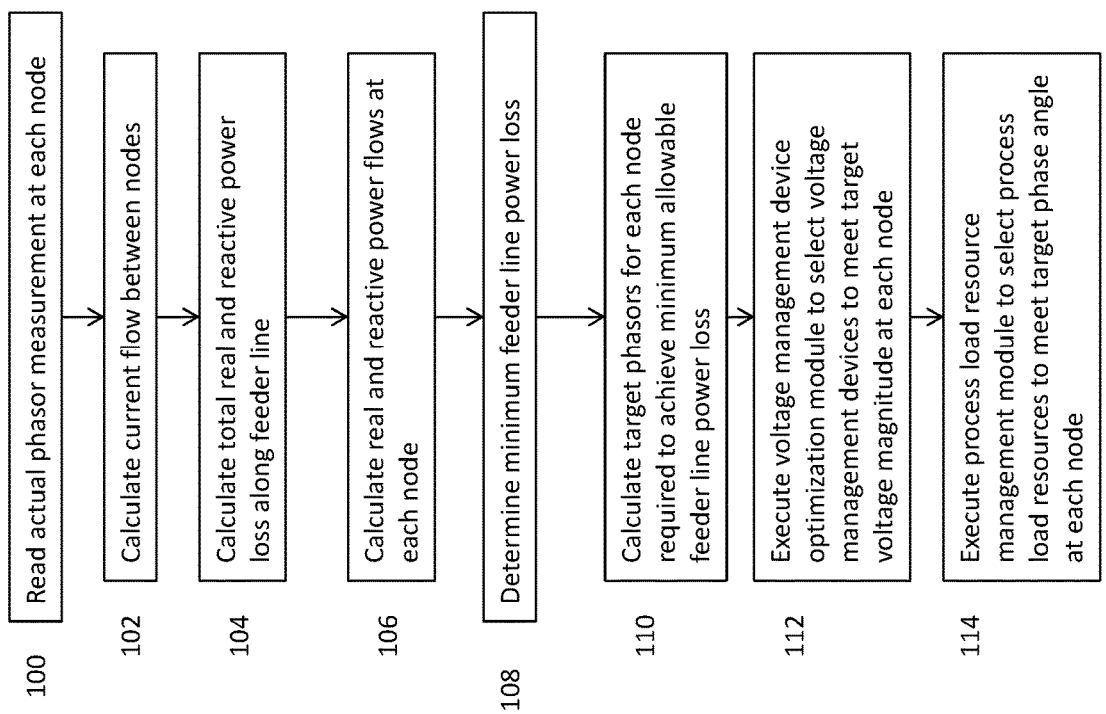
FIG. 2 is a flowchart illustrating execution of a distributed power delivery control program on the central server computer to generate target phasor instructions for each controlled node on the distribution feeder line.

Referring now to FIG. 2, the power control program when executed determines the target phasor of each node that is required to deliver power to the feeder line under the desired conditions, i.e. with minimal substation tap changer operation and minimal feeder line power loss, and selects the real and reactive power resources to meet these determined target phasors.

First, the synchrophasrs 20 at each node 17 are read to obtain measurements of the phasor ("actual phasor") at each node 17 (step 100). The actual phasor consists of the voltage magnitude |V| and angle δ at each node 17, wherein the angle is relative to the substation, which is defined to be at angle zero.

Then, the current flow between each of the nodes 17 is calculated using the measured phasor at each node (step 102), wherein the current I is calculated as:

$$I_L = V_{S-R}/Z_L \quad \text{(equation 1)}$$

wherein $V_{S-R}$ is the voltage difference vector between two adjacent nodes $N_S$ and $N_R$, and $Z_L$ is a phasor representing the impedance of the line sector between the two nodes $N_S$ and $N_R$ and is equal to:

$$Z_L = R_L + jX_L \quad \text{(equation 2)}$$

wherein $R_L$ is the resistance of the line sector, $X_L$ is the inductive reactance of the line sector, and j is the imaginary vector—Sqrt (−1)).

Then, the total real and reactive power loss on the feeder line 11 is calculated (step 104), by summing the real loss (i.e. $I_L^2 R_L$) and reactive power loss (i.e. $I_L^2 X_L$) on each line sector between the nodes.

The real and reactive power being removed or injected at each node 17 is calculated using the measured actual phasor at the nodes 17 (step 106). The real and reactive power must sum to zero at each node 17, so power in from an upstream location is equal to power removed at the node 17+power flowing down the next line sector. The real and reactive power at the sending (upstream) end of the line sector are determined by:

$$\text{Real Power (Watts)} = \frac{1}{R^2 + X^2}(R|V_S|^2 - R|V_s||V_R|\cos\delta + X|V_s||V_R|\sin\delta) \quad \text{(equation 3)}$$

and, $$\text{Reactive Power (VARs)} = \frac{1}{R^2 + X^2}(X|V_S|^2 - X|V_s||V_R|\cos\delta + R|V_s||V_R|\sin\delta) \quad \text{(equation 4)}$$

wherein $V_S$ and $V_R$ are the sending and receiving end voltages of the line sector.

The real power and reactive power at the receiving (downstream) end of the line sector is:

$$\text{Real Power (Watts)} = \frac{1}{R^2 + X^2}(R|V_R|^2 - R|V_s||V_R|\cos\delta + X|V_s||V_R|\sin\delta) \quad \text{(equation 5)}$$

and $$\text{Reactive Power (VARs)} = \frac{1}{R^2 + X^2}(X|V_R|^2 - X|V_s||V_R|\cos\delta + R|V_s||V_R|\sin\delta) \quad \text{(equation 6)}$$

Of note, the real and reactive power going in at the sending end of the line sector is different than the power flowing out of the receiving end of the line sector because of real and reactive power loss in the line sector. In other words, Power In−Line Loss=Power Out for both real and reactive power on each line sector.

Next, the minimum power loss when delivering the required power to the feeder line is calculated (step 108). To minimize power loss along the feeder line 11, the power delivery should be controlled to minimize current flow along the feeder line 11 while still meeting the power delivery and voltage requirements. This can be determined by selecting the power flow leaving each node (sending node) so that the real power leaving the sending node and going down the line sector is only enough to provide for the load at the adjacent downstream node (receiving node) and the line loss along the line sector between the sending and receiving nodes. Also, the reactive power on the line sector leaving each node should be zero; in other words, a reactive power resource at a node should inject only enough reactive power to supply the reactive power loss from the upstream line sector so that the outgoing line sector at the node carries no reactive power. Based on these principles, the allowable feeder line power loss threshold is calculated by:

a) starting at the end of the feeder line 11, calculate the current $I_L$, real power loss and reactive power loss on the last line sector using the measurements of the load and actual phasor at the last line sector;

b) calculate the real power delivered by the next upstream line sector to be the real power required by nodes on the last line sector plus the real power loss on that line sector; and c) calculate the reactive power required from a reactive power resource at the upstream node of the last line sector to be the reactive power required to replace the reactive power used by the last line sector.

Steps (a) to (c) are repeated at each upstream line sector for the entire feeder line 11 (i.e. back to the substation). The minimum total feeder line power loss is determined to be the sum of all of the determined line sector power losses.

Now that the reactive and real power at each node 17 to achieve the minimum total feeder line power loss have been determined, it is possible to determine the voltage magnitude and phase angle settings at each node 17 from equations (3) to (6). That is, equations (3) to (6) can be solved for $|V_S|$, $|V_R|$ and $\delta$ for each line sector L of the feeder line 11, working upwards from the last line sector and to the first line sector coupled to the substation.

An operational constraint is then assigned that represents the maximum allowable feeder line loss an operator will permit when controlling delivery of power to the feeder line 11 (herein referred to as "allowable feeder line power loss threshold"). The allowable feeder line power loss threshold can be set as the minimum feeder line power loss, in which case the determined voltage magnitudes and phase angles represent the target phasor for each node that must be met in order to achieve the minimum total feeder line power loss (step 110). Alternatively, the allowable feeder line power loss threshold can be a higher value as selected by an operator, in which case the target voltage magnitude and target phase angle are adjusted accordingly.

Next, the voltage management device optimization module is executed to select the voltage management devices that will be used to meet the target voltage magnitude at each node (step 112). As noted previously, the voltage management devices include the controllable reactive power resources 16 (i.e. capacitors and inductors) at node sites 17 and the utility voltage management devices 23 at the substation, and these devices 16, 23 can be used to control the reactive power flows at each node 17 and the substation. As is well understood by those skilled in the art, capacitive reactive power resources 16 increase reactive power and consequently increase voltage magnitude at a node 17 and can be selected when the actual voltage magnitude is lower than the target voltage magnitude. Conversely, inductive reactive power resources 16 consume reactive power and consequently decrease voltage magnitude at a node 17 and thus can be selected when the actual voltage magnitude is higher than the target voltage magnitude.

The voltage management device optimization module determines which voltage management devices 16, 23 are available to achieve the target voltage magnitudes at each node 17, selects a cost effective combination of available voltage management devices 16, 23, then sends control signals to controllers of those selected voltage management devices 16, 23 to operate those devices accordingly. The selected combination can be the combination that provides the lowest operating cost, or any one of a number of combinations with have an operating cost below a selected threshold. Because not all nodes 17 may have a reactive power resource 16 that can be controlled by the system 10, it may not be possible to achieve the target voltage magnitudes at each node 17, in which case, the power delivery control program selects the available reactive power resources 16, 23 to come as close as possible to the target voltage magnitude.

Because frequent use of the substation tap changer is generally undesirable, the voltage management device optimization module assigns a comparatively higher operating cost to using the utility voltage management devices 23 and a comparatively lower operating cost to using the capacitors and inductors 16 at the node sites 17. The cost function for each reactive device 16, 23 is assigned based on actual cost. For example, a smart inverter can react quickly with little cost, and as a result is assigned a relatively low operating cost. Conversely, resources such as transformer tap changers that have life limits based on operations, are assigned a relatively high operating cost. Once the operating cost is assigned to each voltage management device 16, 18, a costing subroutine is executed to determine the available voltage management devices 16, 18 and their respective voltage settings.

Next, the power delivery control program executes a process load resource management module to select the real power resources 15 that will be used to meet the target phase angle at each node 17 (step 114). As noted previously, the real power resources 15 include controllable process load resources 15 that serve a primary process, and can be used by the system 10 to control phase angles along the feeder line 11 provided that the usage does not exceed the operational constraints dictated by the load resource's primary process. The use and selection of such process load resources 15 to provide load is disclosed in co-owned PCT application publication no. WO 2011/085477, and is hereby incorporated by reference.

The process load resource management module includes program code which determines which process load resources 14 are the most cost-effective to operate at any given time, then selects those process load resources 15 to meet the target phasor angle at each node along the feeder line. In order to determine the relative cost to operate a process load resource 15 at a particular point in time, the site control module programming includes a costing sub-routine which attributes a cost for operating each process load resource 15 at a particular point in time. The costing subroutine takes into consideration factors such as the cost that must be paid to the primary process operator of the device 16 for using the resource 16 at that time instance. The aggregated cost is then multiplied by a risk factor allocated to each resource 16 at that time instance; this risk factor takes into consideration the risk that over the period of time the resource 16 will be used to provide power delivery control, the primary process operator will override feeder line power control and use the resource 16 for its primary purpose. The costing sub-routine then selects a cost effective combination of process load resources to be operated; a cost effective combination can be the combination of on-line load resources having the lowest operational cost, or any one of a combination of load resources which fall within a defined operational cost budget.

Once the real power resources 15 and the reactive power resources 16 are selected, the system 10 transmits a control signal to the controller 13, 14 at each real and reactive power resource 15, 16 that contains the target phasor for the node of the real and reactive power resource 15, 16. The controllers 13, 14 then operate their associated real and reactive power resource 15, 16 to achieve the target phasor. That is, the load resource controller 13 will increase the load of its load resource when the measured phase angle at the node is lower than the target phase angle, and decrease the load when the measured phase angle is higher than the target phase angle. The reactive power resource controller 14 will engage a capacitive resource 15 to generate reactive power at a node 17 when the measured voltage magnitude at the node is below the target voltage magnitude, and will engage an inductive resource 15 to consume reactive power at a node 17 when the measured voltage magnitude at the node 17 is below the target voltage magnitude. In this manner, the system 10 can provide localized control of the delivery of power to each node 17 along the feeder line 11, at a desirably low feeder line power loss (assuming the allowable feeder line power loss threshold is set at or near the minimum feeder line power loss), while keeping the substation tap changer operation at a minimum (assuming the tap changer 18 is assigned a relatively high operational cost).

Alternatively, the real power resources 15 can include generation resources, in which case, a process generation resource management module is provided to select the generation resource that will be used to meet the target phase angle at each node. Like the load resources, the generation resources can include resources which serve a primary process, in which case the system only controls those generation resources that are on-line, i.e. within the operational constraints of their primary process. In a manner similar to selecting a cost-effective combination of load resources, a costing sub-routine is executed and each available generation resource is assigned a relative operating cost, and the most cost-effective combination of generation resources is selected to meet the target phasor angle at each node along the feeder line. Once the generation resources are selected, the system 10 sends a control signal to each controller of the selected generation resource that contains the target phasor for the node of the generation resource. The controllers then operate their associated generation resource to achieve the target phasor. That is, the generation resource controller will increase the generation of its load resource when the measured phase angle at the node is higher than the target phase angle, and decrease the generation when the measured phase angle is lower than the target phase angle.

While particular embodiments have been described in the foregoing, it is to be understood that other embodiments are possible. It will be clear to any person skilled in the art that modifications of and adjustments to this invention, not shown, are possible as demonstrated through the exemplary embodiment.

What is claimed is:

1. A method for locally controlling delivery of electrical power along a distribution feeder line of an electricity grid, the distribution feeder line comprising a substation and a plurality of nodes, and the plurality of nodes comprising at least a first node having at least one controllable real power resource and a second node having at least one controllable reactive power resource, the method comprising:

(a) monitoring an actual phasor value at each node, a real power value at the first node and a reactive power value at the second node, wherein the actual phasor value for each node includes an actual voltage magnitude and an actual phase angle relative to the substation;

(b) setting a target phasor value at each node that maintains a specified power delivery at a specified voltage to the feeder line, and wherein the power is delivered with a feeder line loss at or below a defined threshold, and wherein the target phasor value for each node includes a target voltage magnitude and a target phase angle relative to the substation;

(c) adjusting operation of the at least one controllable reactive power resource so that the actual voltage magnitude moves towards the target voltage magnitude at each node; and (d) adjusting operation of the at least one controllable real power resource so that the actual phase angle moves towards the target phase angle at each node.

2. The method as claimed in claim 1 wherein the substation comprises a tap changer, and the method further comprises operating the at least one controllable reactive power resource more frequently than the tap changer to control voltage along the feeder line.

3. The method as claimed in claim 2 wherein the tap changer and the at least one controllable reactive power resource are voltage management devices with the at least one controllable reactive resource being assigned a lower operating cost than the tap changer, and the method further comprises selecting one or more voltage management devices to control voltage along the feeder line that is a cost effective combination within a defined operating cost budget for the voltage management devices.

4. The method as claimed in claim 1 wherein the at least one controllable real power resource serves a primary process, and the adjusting of the operation of the least one controllable real power resource falls within operational constraints of the primary process.

5. The method as claimed in claim 4 wherein the at least one controllable real power resource comprises at least one load resource, and adjusting the operation of the at least one controllable real power resource comprises increasing a load on the at least one load resource to increase the actual phase angle, and decreasing the load on the at least one load resource to decrease the actual phase angle.

6. The method as claimed in claim 4 wherein the at least one controllable real power resource comprises at least one generation resource, and adjusting the operation of the at least one controllable real power resource comprises decreasing generation by the at least one generation resource to increase the actual phase angle, and increasing generation by the at least one generation resource to decrease the actual phase angle.

7. The method as claimed in claim 1 wherein the adjusting operation of the at least one reactive power resource comprises using a capacitor to increase reactive power thereby increasing the actual voltage magnitude and using an inductor to decrease reactive power thereby decreasing the actual voltage magnitude.

8. The method as claimed in claim 1 wherein the plurality of nodes include a third node having an intermittent power generation source, and the method further comprises adjusting the target phasor setting at each node after a change in power generation from the intermittent power generation source.

9. The method as claimed in claim 1 wherein the feeder line comprises multiple controllable real power resources, and the method further comprises assigning an operating cost to each controllable real power resource, then selecting a cost-effective combination of controllable real power resources to control phase angle along the feeder line that is within a defined operating cost budget for the real power resources.

10. The method as claimed in claim 1 wherein the step of setting a target phasor value at each node comprises:
   calculating the current flow of a sector of the feeder line between adjacent nodes using the actual phasor value at each of the adjacent nodes;
   calculating the total real and reactive loss on the feeder line by summing a real power loss and a reactive power loss of each sector of the feeder line;
   calculating the real and reactive power being removed or injected at each node using the actual phasor value at each node;
   calculating a minimum total feeder line power loss, by determining a minimum current flow along the feeder line that meets power delivery and voltage requirements of each node; and
   selecting an allowable feeder line power loss threshold that is at least as high as the minimum total feeder line power loss, then determining the voltage magnitude and phase angle at each node that is required to achieve the allowable feeder line power loss.

11. A system for locally controlling delivery of electrical power along a distribution feeder line of an electricity, the distribution feeder line comprising a substation and a plurality of nodes, and the plurality of nodes comprising at least a first node having at least one controllable real power resource and a second node having at least one controllable reactive power resource, the system comprising:
   (a) at least one real power resource controller communicative with and programmed to control operation of the at least one real power resource;
   (b) at least one reactive power resource controller communicative with and programmed to control operation of the at least one reactive power resource; and
   (c) a server computer communicative with the at least one real power resource controller and the at least one reactive power resource controller, and comprising a processor and a memory having encoded thereon program code executable by the processor to:
      (i) monitor an actual phasor value at each node, a real power value at the first node and a reactive power value at the second node, wherein the actual phasor value for each node includes an actual voltage magnitude and an actual phase angle relative to the substation;
      (ii) set a target phasor value at each node that maintains a specified power delivery at a specified voltage to the feeder line, and wherein the power is delivered with a feeder line loss at or below a defined threshold, and wherein the target phasor value for each node includes a target voltage magnitude and a target phase angle relative to the substation;
      (iii) send a control signal to the at least one reactive power resource controller to adjust operation of the at least one reactive power resource so that the actual voltage magnitude moves towards the target voltage magnitude at each node; and
      (iv) send a control signal to the at least one real power resource controller to adjust operation of the at least one real power resource so that the actual phase angle moves towards the target phase angle at each node.

12. The system as claimed in claim 11 further comprising a substation controller communicative with and programmed to control operation of a tap changer in the substation, and wherein the server computer is communicative with the substation controller and further comprises program code that is further executable to send control signals to the reactive power resource controller and the substation controller such that the at least one reactive power resource is operated more frequently than the tap changer to control voltage along the feeder line.

13. The system as claimed in claim 11 further comprising at least one synchrophaser for measuring the actual phasor value at each node and which is communicative with the server computer to transmit a measured actual phasor value to the server computer.

14. The system as claimed in claim 13 wherein the step of setting a target phasor value at each node comprises:
   calculating the current flow of a sector of the feeder line between adjacent nodes using the actual phasor value at each of the adjacent nodes;
   calculating the total real and reactive loss on the feeder line by summing a real power loss and a reactive power loss of each sector of the feeder line;
   calculating the real and reactive power being removed or injected at each node using the actual phasor value at each node;
   calculating a minimum total feeder line power loss, by determining a minimum current flow along the feeder line that meets power delivery and voltage requirements of each node; and
   selecting an allowable feeder line power loss threshold that is at least as high as the minimum total feeder line power loss, then determining the voltage magnitude and phase angle at each node that is required to achieve the allowable feeder line power loss.

* * * * *